F. A. JACKSON.
BEET HARVESTER.
APPLICATION FILED JULY 29, 1913.

1,122,761.

Patented Dec. 29, 1914.

2 SHEETS—SHEET 1.

WITNESSES

INVENTOR
Fredrick A. Jackson
BY Munn & Co.
ATTORNEYS

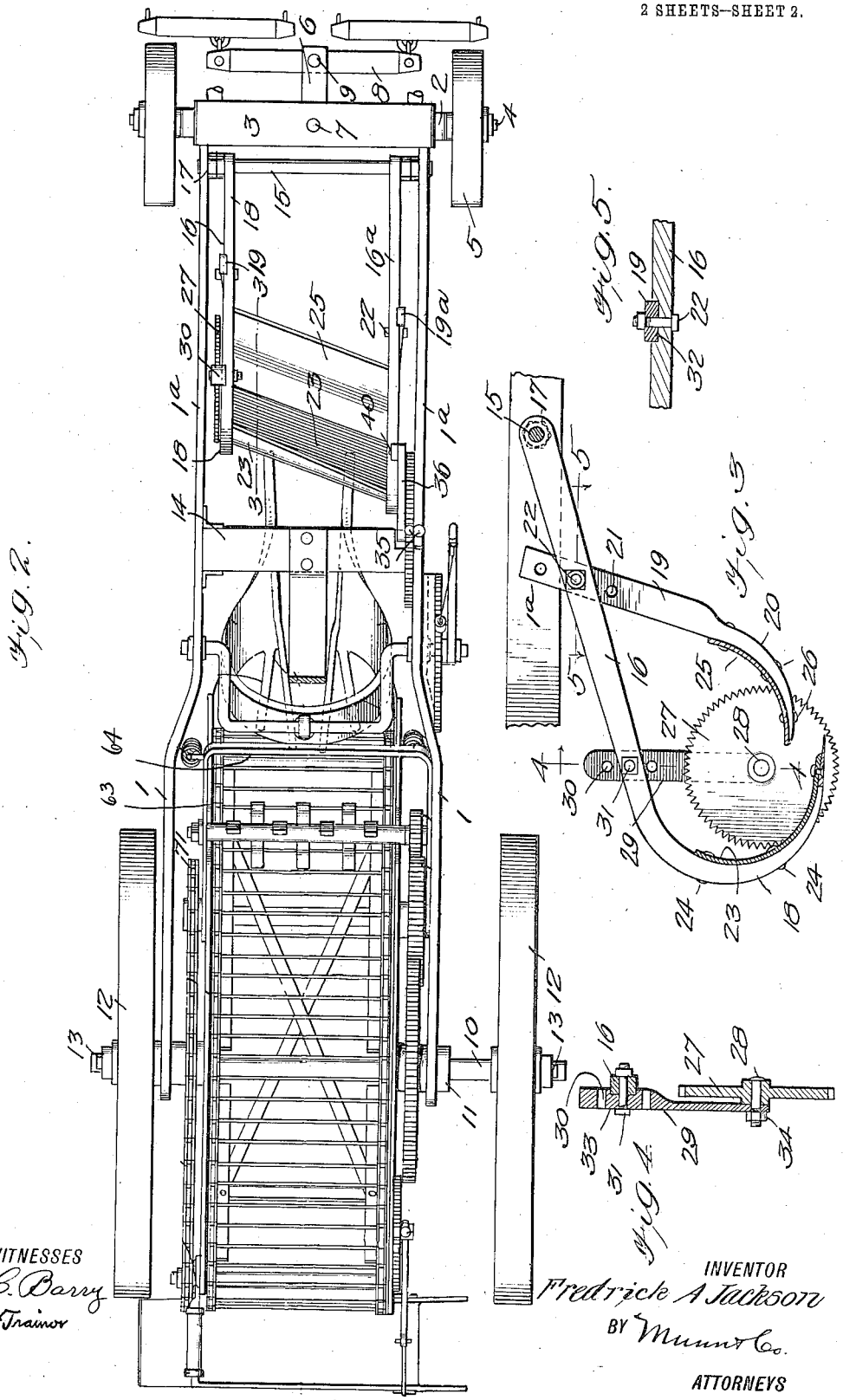

UNITED STATES PATENT OFFICE.

FREDRICK ARTHUR JACKSON, OF IDAHO FALLS, IDAHO.

BEET-HARVESTER.

1,122,761.

Specification of Letters Patent.

Patented Dec. 29, 1914.

Application filed July 29, 1913. Serial No. 781,799.

*To all whom it may concern:*

Be it known that I, FREDRICK A. JACKSON, a citizen of the United States, and a resident of Idaho Falls, in the county of Bonneville and State of Idaho, have made certain new and useful Improvements in Beet-Harvesters, of which the following is a specification.

My invention is an improvement in beet harvesters and has for its object to provide in a harvester of the character specified, a crowning and topping device having means for crowning the beets and for delivering the tops to one side of the machine.

In the drawings: Figure 1 is a side view of the improved harvester, Fig. 2 is a top plan view, Fig. 3 is an enlarged detail sectional view of the crowning mechanism, taken substantially on the line 3—3 of Fig. 2, and Figs. 4 and 5 are sections on the line 4—4 and 5—5 respectively, of Fig. 3.

The present embodiment of the invention comprises a frame consisting of side plates 1, each of which is offset inwardly at its front end as indicated at 1ª, and the said front ends of the plates are connected to the arms 2 of a substantially U-shaped bracket, the said bracket comprising the said arms 2 and a body 3. Each of the arms 2 is provided at its lower end with a lateral outwardly extending spindle 4 and a wheel 5 is journaled on each spindle.

A clevis 6 is connected with the body of the bracket by means of a bolt 7. A draft apparatus 8, in the present instance double trees, is pivoted to the clevis as indicated at 9. An axle 10 is journaled transversely of the rear ends of the plates 1 in bearings 11, and wheels 12 are secured to the ends of the axle and are held in place by pins 13 or the like. The plates 1 are connected intermediate their ends by a cross bar 14, and a shaft 15 is journaled in the said plates and transversely thereof near the bracket 2—3.

Arms 16 and 16ª are pivoted on the shaft, each arm adjacent to one of the plates 1—1ª and on the inner side thereof, the arms being held in place with respect to the plates by means of collars 17. Each of the arms 16 is provided at its rear end with an arc shaped portion 18, and second arms 19 and 19ª respectively, are adjustably connected with each of the arms 16 and 16ª intermediate the arc shaped portion 18 and the shaft 15.

Each of the arms 19, 19ª is provided at its free end with an arc shaped portion 20, and each of the said arms 16, 16ª and 19, 19ª is reduced in width from the commencement of the said portion to the free end thereof. Each of the arms 19 and 19ª is provided with a longitudinally extending series of openings 21 at the end remote from the arc shaped portion, and a bolt 22 is passed through one of the said openings and a registering opening in the arm 16 or 16ª, and is engaged by a nut to adjustably connect the said arm to the arm 16 or 16ª.

A transversely curved blade 23 is secured to the arc shaped portions of the arms 16 and 16ª, and on the concave edges thereof by means of rivets 24 or the like, and another blade 25 is secured to the arc shaped portions of the arms 19 and 19ª, the said blade being on the concave edges of the arms, and secured thereto by rivets 26 or the like.

It will be noticed from an inspection of Fig. 2 that the body portion of the arm 16ª is of greater length than the body portion of the arm 16, so that the arc shaped portion thereof is in rear of the arc shaped portion of the arm 16. Thus the blade 23 will be inclined with respect to the direction of motion of the machine. The arms 19 and 19ª are spaced apart from the arc shaped portions of the arms 16 and 16ª the same distance so that the blade 25 is inclined in the same manner, as the blade 23. The cutting edge of the blade 23 is spaced below the free edge of the blade 26, so that when the said blade 23 crowns the beets while they are still in the ground, the crowns will pass upon the concave surface of the blade 23 to the right of the machine, where the tops and crowns will be delivered at one side of the row. By means of mechanism to be presently described, the crowning device may be adjusted to crown the beets at any desired point.

At the end of the crowning device remote from the point of delivery, a toothed wheel or colter 27 is supported, the said colter being journaled on a journal pin 28 at the lower end of a stock or standard 29 adjustably connected with the arm 16. The stock or standard is provided with a longitudinal series of openings 30 and a bolt 31 is passed through one of the said openings and a registering opening in the arm to and a registering opening in the arm to connect the stock or standard, to the arm. The engaging end of the toothed wheel 27 is below the cutting edge of the blade 23, and the toothed wheel removes a portion of the tops during the crowning operation.

It will be noticed from an inspection of Fig. 5 that the arms 16 and 16ª are mortised on one face or grooved transversely, as indicated at 32 to receive the arms 19 and 19ª, the mortising or grooving insuring that the arm 19 will bear the same angle with respect to the arm 16 or 16ª at whatever point the said arms may be connected. As shown in Fig. 4, the standard 29 of the toothed wheel 27 is mortised or grooved transversely, as indicated at 33 to receive the arm 16, this being for the same purpose as specified for the groove 32. The journal pin 28 is a bolt, which is passed through the hub of the wheel 27 and an opening in the standard and is engaged by a nut 34 to hold the parts in place.

The crowning device is adjusted, by means of an elbow lever 35, 36, the said lever being pivoted at 37 to one of the side bars 1—1ª. The arm 35 of the lever is provided with latch mechanism 38 coöperating with a toothed quadrant 39 secured to the frame and the arm 36 of the elbow lever is connected to the arm 19ª of the topping device by means of a link 40. When the latch mechanism is released, the arm 35 of the lever may be swung to raise or lower the topping mechanism. In rear of the crowning and topping mechanism is arranged the lifting mechanism for the beets for removing them from the ground.

A seat 87 is connected to the cross bar 14 of the frame, by means of a spring plate 88, and the said seat is arranged adjacent the lever 35.

In operation, the machine is drawn through the field in any desired manner, and with the members of the pairs of wheels 5 and 12 on opposite sides of the row. The crowning and topping device is adjusted to crown the beets at the proper point, and as the machine advances the cutting edge of the blade 23 removes the top and the crowns and they are passed outwardly to the right of the machine. The toothed wheel 27 removes the superfluous tops.

I claim:—

1. In a beet harvester, the combination with a wheel supported main frame, of crowning and topping mechanism, said mechanism comprising arms pivoted to the frame at each side thereof, each arm having an arc shaped portion at its rear end and with its concave edge forwardly, a transverse curved blade connecting the arc shaped portions of the arms and arranged with its concave face upwardly and having its forward edge beveled to form a cutting edge, a second arm adjustably connected with each of the first named arms, each of the second named arms having an arc shaped portion at its lower end, the concave edge of the arm being rearward, a transversely grooved plate secured to the second named arms, the free edge of the said plate being above the free edge of the first named plate, one of the first named arms being of greater length than the other between its pivotal connection with the main frame and the connection of the second frame to cause the plates to take an inclined position with respect to the direction of motion of the frame, means for raising and lowering the crowning device, a toothed wheel at the entrance end of the crowning device, and means for adjustably connecting the said wheel to the adjacent of the first named arms.

2. In a beet harvester, the combination with a wheel supported main frame, of crowning and topping mechanism, said mechanism comprising arms pivoted to the frame at each side thereof, each arm having an arc shaped portion at its rear end and with its concave edge forwardly, a transverse curved blade connecting the arc shaped portions of the arms and arranged with its concave face upwardly and having its forward edge beveled to form a cutting edge, a second arm adjustably connected with each of the first named arms, each of the second named arms having an arc shaped portion at its lower end, the concave edge of the arm being rearward, a transversely grooved plate secured to the second named arms, the free edge of the said plate being above the free edge of the first named plate, said plates being inclined, and means for raising and lowering the cutting device.

3. In a beet harvester, a crowning and topping device, comprising a pair of arms each having an arc shaped portion at one end, a transversely grooved plate connecting the arc shaped portions of the arms and having its concave face forwardly, a second arm adjustably connected with each of the first named arms and having an arc shaped portion at its lower end, a transversely grooved plate connecting the arc shaped portions of the arms, said plate having its concave face rearwardly and having its free edge above the free edge of the first named plate, one of the said arms being of greater length than the other, and means for raising and lowering the crowning and topping device.

4. In a beet harvester, a crowning and topping device, comprising a pair of arms each having an arc shaped portion at one end, a transversely grooved plate connecting the arc shaped portions of the arms and having its concave face forwardly, a second arm adjustably connected with each of the first named arms and having an arc shaped portion at its lower end, a transversely grooved plate connecting the arc shaped portions of the arms, said plate having its concave face rearwardly and having its free edge above the free edge of the first named plate, one of the said arms being of greater length than the other.

5. In a beet harvester, a crowning and topping device comprising transversely grooved plates arranged with their concave faces adjacent and with the rear edge of one plate directly above the front edge of the other plate, an adjustable connection between the plates for permitting the adjacent edges thereof to be adjusted toward and from each other, and means for supporting the said plates with their free edges parallel and inclined.

6. In a beet harvester, a crowning and topping device comprising transversely grooved plates arranged with their concave faces adjacent and with the rear edge of one plate directly above the front edge of the other plate, and an adjustable connection between the plates for permitting the adjacent edges thereof to be adjusted toward and from each other.

7. In a beet harvester, a crowning and topping device, comprising plates arranged one above the other, the lower plate having its forward edge free and sharpened to crown the beets, and the upper blade being adjustable with respect to the lower blade.

FREDRICK ARTHUR JACKSON.

Witnesses:
GEO. N. JACKSON,
FRED M. JOHNSON.